United States Patent
Bastide et al.

(10) Patent No.: US 11,308,454 B2
(45) Date of Patent: Apr. 19, 2022

(54) TRUSTED CROWD DETERMINED TIME MANAGEMENT

(71) Applicant: International Business Machines Corporation, Armonk, NY (US)

(72) Inventors: Paul R. Bastide, Boxford, MA (US); Lisa Seacat DeLuca, Baltimore, MD (US)

(73) Assignee: International Business Machines Corporation, Armonk, NY (US)

( * ) Notice: Subject to any disclaimer, the term of this patent is extended or adjusted under 35 U.S.C. 154(b) by 161 days.

(21) Appl. No.: 16/014,179

(22) Filed: Jun. 21, 2018

(65) Prior Publication Data

US 2019/0392398 A1 Dec. 26, 2019

(51) Int. Cl.
| | |
|---|---|
| *G06Q 10/06* | (2012.01) |
| *G06Q 10/10* | (2012.01) |
| *H04L 67/306* | (2022.01) |
| *G06N 20/00* | (2019.01) |
| *G06F 16/25* | (2019.01) |

(52) U.S. Cl.
CPC ....... *G06Q 10/1095* (2013.01); *G06F 16/254* (2019.01); *G06N 20/00* (2019.01); *G06Q 10/109* (2013.01); *H04L 67/306* (2013.01)

(58) Field of Classification Search
None
See application file for complete search history.

(56) References Cited

U.S. PATENT DOCUMENTS

| | | | |
|---|---|---|---|
| 6,016,478 A * | 1/2000 | Zhang | G06Q 10/06314 |
| | | | 705/7.19 |
| 8,275,837 B1 * | 9/2012 | Alexander | G06Q 10/109 |
| | | | 709/204 |
| 9,195,972 B2 * | 11/2015 | Gopinath | G06Q 10/1093 |
| 10,643,292 B1 * | 5/2020 | Gorman-Ladd | G06Q 50/01 |
| 2002/0111845 A1 * | 8/2002 | Chong | G06Q 10/109 |
| | | | 705/7.13 |

(Continued)

OTHER PUBLICATIONS

Wu et al. (C. Wu, K. Chen, Y. Chang and C. Lei, "Crowdsourcing Multimedia QoE Evaluation: A Trusted Framework," in IEEE Transactions on Multimedia, vol. 15, No. 5, pp. 1121-1137, Aug. 2013, doi: 10.1109/TMM.2013.2241043).*

(Continued)

*Primary Examiner* — Matthew D Henry
(74) *Attorney, Agent, or Firm* — Edell, Shapiro & Finnan, LLC (57) ABSTRACT

Methods, systems, and computer program products are provided. Details of a calendar item may be extracted. A conflict involving the calendar item and a second calendar item may be detected. Plural votes related to an importance of the calendar item may be received on behalf of a trusted crowd. When a vote is not received on behalf of a member of the trusted crowd within a certain time period, a prediction may be made regarding how the member of the trusted crowd would vote based on using machine learning to analyze a voting history of the member of the trusted crowd with respect to calendar items related to a subject of the calendar item. The predicted vote may be submitted on behalf of the member. One of the calendar item and the second calendar item may be altered based on a tally of the plural votes to resolve the conflict.

14 Claims, 7 Drawing Sheets

(56) References Cited

U.S. PATENT DOCUMENTS

| | | | | |
|---|---|---|---|---|
| 2003/0004773 A1* | 1/2003 | Clark | G06Q 10/1095 | 705/7.19 |
| 2003/0204474 A1* | 10/2003 | Capek | G06Q 20/382 | 705/64 |
| 2004/0064585 A1* | 4/2004 | Doss | G06Q 10/1097 | 709/246 |
| 2005/0065832 A1* | 3/2005 | Virta | G06Q 10/1093 | 705/7.18 |
| 2008/0033778 A1* | 2/2008 | Boss | G06Q 10/109 | 705/7.18 |
| 2008/0040188 A1* | 2/2008 | Klausmeier | G06Q 10/1093 | 705/7.18 |
| 2008/0059256 A1* | 3/2008 | Lynch | G06Q 10/063 | 705/7.24 |
| 2009/0235280 A1* | 9/2009 | Tannier | G06Q 10/00 | 719/318 |
| 2009/0313074 A1 | 12/2009 | Harpur et al. | | |
| 2010/0088143 A1* | 4/2010 | Platt | G06Q 10/109 | 705/7.18 |
| 2010/0088144 A1* | 4/2010 | Collet | G06Q 10/06311 | 705/7.13 |
| 2010/0180212 A1* | 7/2010 | Gingras | G06Q 10/109 | 715/751 |
| 2010/0318398 A1* | 12/2010 | Brun | G06Q 10/1093 | 705/7.18 |
| 2011/0106892 A1* | 5/2011 | Nelson | G06Q 10/109 | 709/206 |
| 2011/0184943 A1* | 7/2011 | Norton | G06Q 10/02 | 707/723 |
| 2011/0282684 A1* | 11/2011 | Chua | G06Q 10/109 | 705/2 |
| 2012/0143638 A1* | 6/2012 | Kho | G06Q 10/02 | 705/5 |
| 2013/0304758 A1* | 11/2013 | Gruber | G06F 16/248 | 707/769 |
| 2014/0082521 A1 | 3/2014 | Carolan et al. | | |
| 2014/0149886 A1* | 5/2014 | Los | G06F 3/0481 | 715/753 |
| 2014/0162241 A1* | 6/2014 | Morgia | G06Q 50/10 | 434/362 |
| 2014/0208445 A1* | 7/2014 | DeLuca | H04W 12/02 | 726/30 |
| 2014/0235276 A1* | 8/2014 | Lefkowitz | G06Q 10/1095 | 455/456.3 |
| 2014/0344745 A1* | 11/2014 | Possing | G06Q 10/109 | 715/772 |
| 2014/0351026 A1* | 11/2014 | Merel | G06Q 30/02 | 705/12 |
| 2015/0095292 A1* | 4/2015 | Dryfoos | G06F 16/1724 | 707/693 |
| 2015/0302531 A1* | 10/2015 | Thier | G06Q 40/10 | 705/30 |
| 2016/0189109 A1* | 6/2016 | Le | G06Q 10/1095 | 705/7.19 |
| 2016/0259778 A1* | 9/2016 | Cookson | G06Q 10/107 | |
| 2016/0275458 A1 | 9/2016 | Meushar et al. | | |
| 2016/0350721 A1* | 12/2016 | Comerford | G06Q 10/1095 | |
| 2016/0357861 A1* | 12/2016 | Carlhian | G06F 16/36 | |
| 2016/0364698 A1* | 12/2016 | Bouz | G06Q 10/1095 | |
| 2017/0061357 A1* | 3/2017 | Dubey | G06Q 10/105 | |
| 2017/0091320 A1* | 3/2017 | Psota | G06F 16/334 | |
| 2017/0300868 A1* | 10/2017 | Johnson | G06Q 10/1095 | |
| 2017/0300869 A1* | 10/2017 | Johnson | G06Q 10/1093 | |
| 2017/0316385 A1* | 11/2017 | Joshi | G06F 16/9535 | |

OTHER PUBLICATIONS

The System or Method to Faciliate Meeting Scheduling by Providing Multiple Meeting Time-Slots, IPCOM000231009D, Sep. 22, 2013, Abstract, p. 1, http://ip.com/IPCOM/000231009.

Jon Guerrera, "How to Gamify Your Life: An Experiment-Part 4", Jan. 15, 2012, retrieved from https://livingforimprovement.com/how-to-gamify-your-life-an-experiment-part-4-ed50e109e719, 8 pages.

Jon Guerrera, "How to Gamify Those Pesky New Year's Resolutions", Jan. 2, 2013, retrieved from http://www.gamification.co/2013/01/02/how-to-gamify-your-goals-a-step-by-step-guide/.

Marissa Brassfield, "3 Ways to Gamify Your Day", Jan. 14, 2012, retrieved from https://ridiculouslyefficient.com/blog/gamify-your-day.

Carman Neustaedter et al., "The Calendar is Crucial: Coordination and Awareness through the Family Calendar", Apr. 2009, ACM Transactions on Computer-Human Interaction, vol. 6, No. 1, Article 6, 48 pages.

"IBM SPSS Text Analytics for Surveys", retrieved from https://www.ibm.com/us-en/marketplace/spss-text-analytics-for-surveys/details#product-header-top on Jun. 20, 2018.

"IBM SPSS Statistics", retrieved from https://www.ibm.com/products/spss-statistics on Jun. 20, 2018.

"Natural Language Processing", Jun. 17, 2018, retrieved from https://en.wikipedia.org/wiki/Natural_language_processing.

"Get Together With Doodle—The simple way to decide on dates, places & more", retrieved from https://doodle.com/ on Jun. 20, 2018.

* cited by examiner

TRUSTED CROWD DETERMINED TIME MANAGEMENT

BACKGROUND

1. Technical Field

Present invention embodiments relate to a computer system, a method and a computer program product for managing conflicting calendar items based on a level of importance of each calendar item. In particular, present invention embodiments relate to obtaining votes regarding a level of importance of calendar items and managing conflicts among the calendar items based on the votes.

2. Discussion of the Related Art

Existing calendaring systems help users stay organized and stay aware of scheduled activities. However, many calendaring systems lack modern appeal, insight, and easy-to-use functionality. As more and more items are added to a calendar, a day-at-a glance view loses meaning due to a need to scroll the view to see the items scheduled throughout the day. In order to better understand what items are scheduled for a current day as well as upcoming days or weeks, users often switch between the day-at-a-glance view and a main calendar view. In some calendaring systems, as an increasing number of items are added to a calendar, a user my not easily notice conflicts among some of the items. In addition, associates of the user may have difficulty scheduling meetings or other events that require the user's presence due to crowding of items in the user's calendar.

SUMMARY

According to an aspect of embodiments of the invention, a computer-implemented method is provided for managing a calendar. A computer system may extract details of a calendar item of the calendar, wherein the details include a subject of the calendar item. A conflict involving the calendar item and a second calendar item may be detected by the computer system. The computer system may receive plural votes related to an importance of the calendar item on behalf of a trusted crowd. When a vote related to the importance of the calendar item is not received on behalf of a member of the trusted crowd within a certain time period, a prediction may be made regarding how the member of the trusted crowd would vote based on using machine learning to analyze a voting history of the member of the trusted crowd with respect to calendar items related to the subject, and the predicted vote may be submitted on behalf of the member of the trusted crowd. The computer system may alter one of the calendar item and the second calendar item based on a tally of the plural votes to resolve the conflict.

According to another aspect of the embodiments of the invention, a computer system is provided for managing a calendar. The computer system includes at least one processor and a memory connected to the at least one processor. The computer system is configured to extract details of a calendar item of the calendar including a subject of the calendar and detect a conflict involving the calendar item and a second calendar item. Plural votes related to an importance of the calendar item are received by the computer system on behalf of a trusted crowd. When a vote related to the importance of the calendar item is not received on behalf of a member of the trusted crowd within a certain time period, a prediction may be made regarding how the member of the trusted crowd would vote based on using machine learning to analyze a voting history of the member of the trusted crowd with respect to calendar items related to the subject, and the predicted vote may be submitted on behalf of the member of the trusted crowd. The computer system alters one of the calendar item and the second calendar item based on a tally of the plural votes to resolve the conflict.

According to yet another aspect of the embodiments of the invention, a computer program product is provided that includes at least one computer readable storage medium having computer readable program code embodied therewith for execution on at least one processor of a processing device. The computer readable program code is configured to be executed by the at least one processor to extract details of a calendar item of a calendar including a subject of the calendar item and detect a conflict involving the calendar item and a second calendar item. Plural votes related to an importance of the calendar item are received on behalf of a trusted crowd. When a vote related to the importance of the calendar item is not received on behalf of a member of the trusted crowd within a certain time period, a prediction may be made regarding how the member of the trusted crowd would vote based on using machine learning to analyze a voting history of the member of the trusted crowd with respect to calendar items related to the subject, and the predicted vote may be submitted on behalf of the member of the trusted crowd. Based on a tally of the plural votes, one of the calendar item and the second calendar item is altered to resolve the conflict.

BRIEF DESCRIPTION OF THE DRAWINGS

Generally, like reference numerals in the various figures are utilized to designate like components.

DETAILED DESCRIPTION

In various embodiments, a computer system, a method, and a computer program product are provided for managing a calendar. Details of a calendar item, which may represent a meeting or an event, may be extracted and conflicts involving the calendar item may be detected. Votes related to a level of importance of the calendar item may be received from a trusted crowd and the calendar item or a second conflicting calendar item may be altered in order to resolve a conflict based on a tally of the votes.

In this specification, "trusted crowd" refers to those who are asked to vote regarding a level of importance of a calendar item. In some embodiments, the trusted crowd may include only those who are required to attend a meeting or event to which the calendar item refers. In other embodiments, an originator of the calendar item may specify those who are included in the trusted crowd. In yet other embodiments, a subject matter of the calendar item may be analyzed and those who are considered experts regarding the subject matter may be included in the trusted crowd. Further embodiments may permit an originator of a calendar item, or other authorized user, to specify users or domains to be excluded from the trusted crowd regarding the calendar item. In some variation of the embodiments, the trusted crowd may be limited to a team, an organization, a domain, specified individuals, or a company. In some implementations, a user may delegate his or her vote to another user such that the other user may be requested to vote in place of the user.

In this specification, an owner of a calendar item is defined as a party who created the calendar item or a party for which the calendar item was created on his or her behalf. In some embodiments, an owner of a calendar item may specify the calendar item as being private. In such embodiments, a subject of a calendar item that is specified as being private may be obfuscated. This may be accomplished by extracting and analyzing the subject. In some embodiments, natural language processing may analyze the subject to determine a category to which the subject belongs by detecting a presence of one or more keywords or phrases included in the subject. The subject may then be replaced by the determined category.

Other features may be included in various embodiments of the invention and will be described in detail below.

Figure 1:
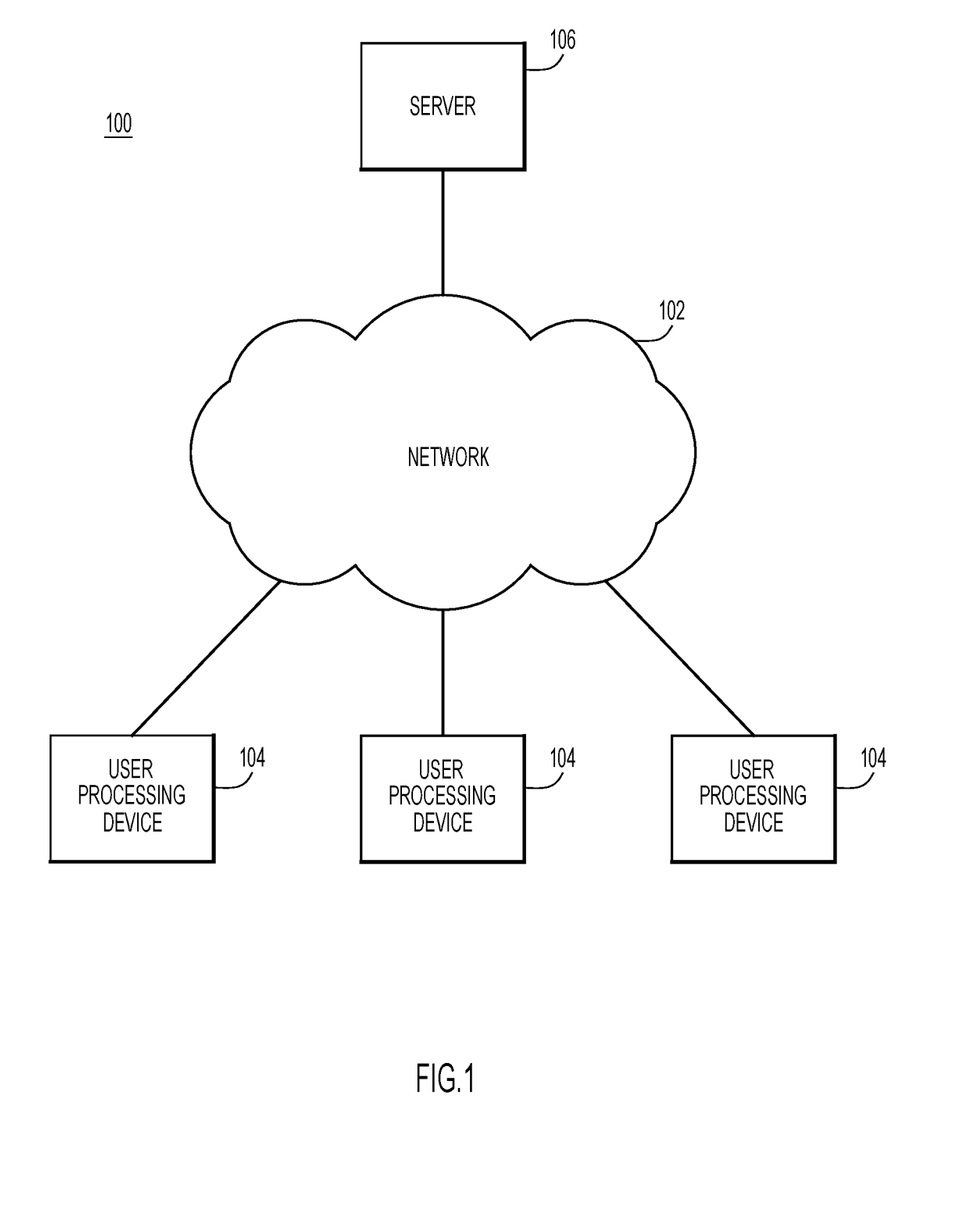
FIG. 1 illustrates an example environment in which embodiments of the invention may operate.

FIG. 1 illustrates an example environment 100 in which embodiments of the invention may operate. Example environment 100 may include a network 102 to which are connected, via a wired or a wireless connection, a number of user processing devices 104 and a server 106. User processing device 104 may include, but not be limited to, a smartphone, a tablet computer, a laptop computer or a notebook computer, a desktop computer, a mainframe computer, or other type of computer. User processing devices 104 may communicate with server 106 via network 102. In some embodiments, user processing devices 104 may communicate with other user processing devices 104 via network 102. Server 106 may include, but not be limited to, a desktop computer, a laptop computer, a mainframe computer, or other type of computer or may include a number of computers configured as a server farm.

Network 102 may be implemented by any number of any suitable communications media, such as a wide area network (WAN), local area network (LAN), Internet, Intranet, etc.) or a combination of any of the suitable communications media. Network 102 may further include wired and/or wireless networks.

Figure 2:
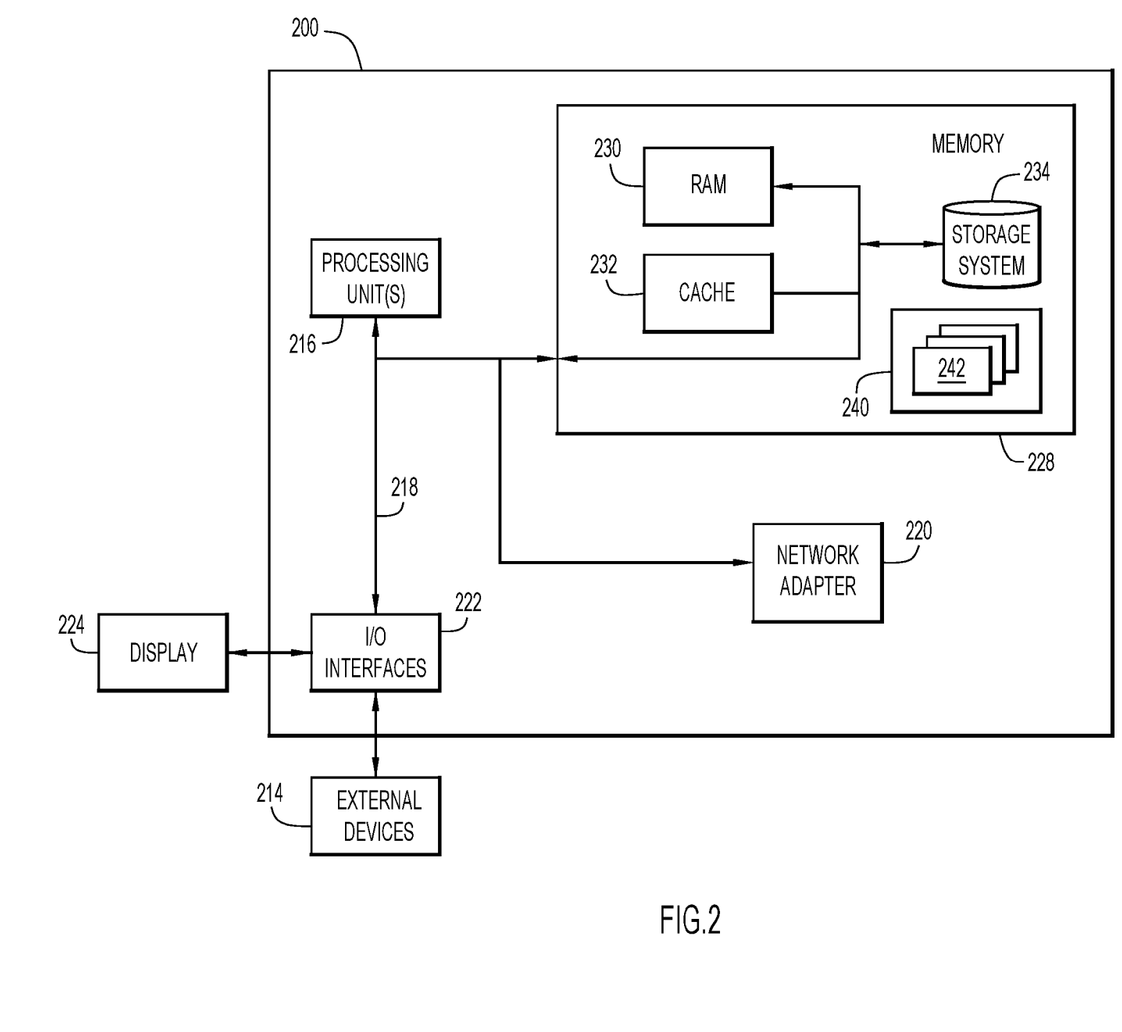
FIG. 2 is a functional block diagram of a computer system that may implement a user processing device or a server according to embodiments of the invention.

Referring now to FIG. 2, a schematic of an example computer system 200 is shown. Computer system 200 may implement user processing device 104 or server 106. Computer system 200 is shown in a form of a general-purpose computing device. Components of computer system 200 may include, but are not limited to, one or more processors or processing units 216, a system memory 228, and a bus 218 that couples various system components including system memory 228 to one or more processing units 216.

Bus 218 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system 200 may include a variety of computer system readable media. Such media may be any available media that is accessible by computer system 200, and may include both volatile and non-volatile media, removable and non-removable media.

System memory 228 can include computer system readable media in the form of volatile memory, such as random access memory (RAM) 230 and/or cache memory 232. Computer system 200 may further include other removable/non-removable, volatile/non-volatile computer system storage media. By way of example only, storage system 234 can be provided for reading from and writing to a non-removable, non-volatile magnetic medium (not shown, which may include a "hard drive" or a Secure Digital (SD) card). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 218 by one or more data media interfaces. As will be further depicted and described below, memory 228 may include at least one program product having a set (e.g., at least one) of program modules that are configured to carry out the functions of embodiments of the invention.

Program/utility 240, having a set (at least one) of program modules 242, may be stored in memory 228 by way of example, and not limitation, as well as an operating system, one or more application programs, other program modules, and program data. Each of the operating system, the one or more application programs, the other program modules, and the program data or some combination thereof, may include an implementation of a networking environment. Program modules 242 generally carry out the functions and/or methodologies of embodiments of the invention as described herein.

Computer system 200 may also communicate with one or more external devices 214 such as a keyboard, a pointing device, one or more displays 224, one or more devices that enable a user to interact with computer system 200, and/or any devices (e.g., network card, modem, etc.) that enable computer system 200 to communicate with one or more other computing devices. Such communication can occur via Input/Output (I/O) interfaces 222. Still yet, computer system 200 can communicate with one or more networks such as a local area network (LAN), a general wide area network (WAN), and/or a public network (e.g., the Internet) via network adapter 220. As depicted, network adapter 220 communicates with the other components of computer system 200 via bus 218. It should be understood that, although not shown, other hardware and/or software components could be used in conjunction with computer system 200. Examples, include, but are not limited to: microcode, device drivers, redundant processing units, external disk drive arrays, RAID systems, tape drives, and data archival storage systems, etc.

In some embodiments of the invention, server 106 may receive a calendar item of an owner, may obtain calendars of users required to attend a meeting or event associated with the calendar item, may request and tally votes regarding a level of importance of calendar items, may reschedule calendar items, may reconcile scheduled calendar items with calendars of the users required to attend, and may send notifications to users regarding any schedule changes to calendar items. In other embodiments, user calendars may be stored and maintained by server 106 and obtained and displayed to users on user processing devices 104 as needed. In yet other embodiments, user calendars may be stored in each user's user processing device 104 and obtained by other user processing devices as needed. In such embodiments, processing may be distributed among user processing devices 104 and server 106 may not be needed. In the description that follows, processing may occur in any of user processing devices 104, server 106, or a combination thereof.

Figure 3:
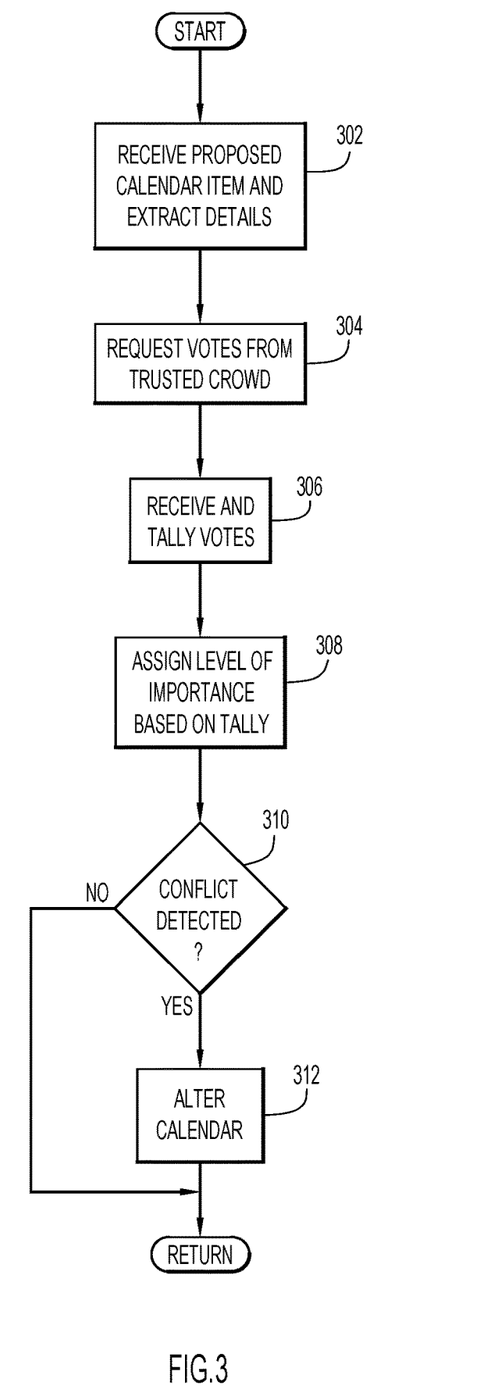
FIG. 3 is a flowchart of an example process for extracting details of a received calendar item, receiving requested votes from a trusted crowd, tallying the votes, and altering a calendar to resolve a detected conflict based on the tallied votes according to embodiments of the invention.

FIG. 3 shows a flowchart of an example process that may be performed by embodiments of the invention. The process may begin with a calendar application receiving a calendar item from an owner of the calendar item and extracting details of the calendar item (act 302). Because many calendaring systems send calendar items to invited users as email messages, in some embodiments, the details may be included as Multipurpose Internet Mail Extensions (MIME). The details may include, but not be limited to, items corresponding to:

"To:"—specifies one or more email addresses of one or more parties to whom a message is sent;

"From:"—specifies an email address of a party from whom a message is sent;

"CC:"—specifies one or more email addresses of those parties who are to receive a courtesy copy of the message;

"Subject:"—specifies a subject of the message;

"Location:"—specifies a location of a meeting or event to which the message refers;

"Start Time:"—a starting time of a meeting or event to which the message refers; and "End Time:"—an ending time of a meeting or event to which the message refers.

Next, votes from a trusted crowd may be requested regarding a level of importance of the received calendar item (act 304). As mentioned earlier, in various embodiments the trusted crowd may include, but not be limited to, parties who are required to attend the meeting or event to which the calendar item refers, parties who are considered to be experts with respect to a subject of the calendar item, and parties who have been delegated by others to be included in the trusted crowd for a calendar item.

Votes may then be received and tallied (act 306). In some embodiments of the invention, votes may not be tallied until all parties of the trusted crowd have voted or until expiration of a voting time period such as, for example, one hour, four hours, one day, or another suitable voting time period. In various embodiments, a reminder to vote may be sent to members of a trusted crowd who have not yet voted. The reminder may be sent after an amount of time has passed after the request to vote was sent and no vote was received from at least some of the members of the trusted crowd. In some embodiments, the amount of time may be half an amount of time allowed for members of the trusted crowd to vote, but other amounts of time may be used in other embodiments. A level of importance for the calendar item may be assigned based on the tallying of votes (act 308).

As an example of vote tallying, suppose users A, B, C and D are invited and required to attend a meeting at a particular time and date. To simplify the example, users A, B, C and D are included in the trusted crowd with respect to a calendar item representing the meeting. Each of the users may be requested to vote on a level of importance regarding the calendar item concerning the meeting. In this example, each of the users may be requested to respond with an integer that is less than or equal to 10 and greater than or equal to 0, where 0 indicates no importance and 10 indicates a highest level of importance. In other words, 0 indicates that canceling or postponing the calendar item would not create a problem, while 10 indicates that the calendar item is very important and cancellation or postponement would have a significant negative impact. Users A, B, C and D, respectively, voted 3, 8, 10 and 5 regarding the level of importance of the calendar item. The votes may be tallied as follows:

$$\frac{\sum_{i=userA}^{userD} vote_i}{\text{number of users voting}},$$

where $vote_i$ indicates a vote of user A, user B, user C, or user D. Thus, in this example, the tallied vote is $$\frac{3+8+10+5}{4} = \frac{26}{4} = 6.5,$$

which may be assigned as the level of importance of the calendar item.

A determination may then be made regarding whether a conflict is detected regarding the calendar item (act 310). This determination may be made by accessing calendars of users A, B, C and D and determining whether a requested time for the calendar item overlaps, at least partially, with at least one other calendar item from the calendars of users A, B, C and D. If a conflict is detected, the calendars of users A, B, C and D, as well as the calendar of the owner, or creator, of the calendar item may be altered to resolve the conflict (act 312).

Continuing with the above-mentioned example, suppose that the calendar item, which has been assigned a level of importance of 6.5, is scheduled for next Tuesday, from 2 pm to 3 pm. Also assume that, among the users required to attend the meeting or event represented by the calendar item, there is a second calendar item representing a meeting or event that is scheduled for next Tuesday from 12:30 pm to 2:30 pm, which had been assigned a level of importance that is less than 6.5. Server 106 may either shorten a duration of the second calendar item such that the meeting or event represented by the second calendar item ends at 2 pm or server 106 may change a time slot for the second calendar item to another time slot that does not conflict with other calendar items of users required to attend the meeting or event represented by the second calendar item. The owner of the second calendar item and the users required for the second calendar item may be sent notifications regarding a change of a scheduled time for the second calendar item.

In the above example, members of the trusted crowd may be asked to vote on a level of importance for a calendar item such that the level of importance may be an integer in a different range such as, for example, 0 to 100 or another range. In some embodiments, the level of importance may be a real number such as, for example, 9.5, or another value. In other embodiments, the level of importance may not be a number at all, but instead may be, for example: extremely low, very low, slightly low, average, slightly high, very high, extremely high. To determine a level of importance based on votes, in this embodiment, numerical values may be assigned to each of the levels. For example, extremely low may be assigned a value of 1, very low may be assigned a value of 2, slightly low may be assigned a value of 4, average may be assigned a value of 5, slightly high may be assigned a value of 6, very high may be assigned a value of 9, and extremely high may be assigned a value of 10. Assuming the received votes are very low, very high, extremely high, and slightly low, then the level of importance may be calculated as $$\frac{1+9+10+4}{4} = \frac{24}{4} = 6,$$

which may then be mapped to a closest level of importance such as slightly high.

In some embodiments of the invention, a calendar item may be locked or fluid. When a conflict is detected, a fluid calendar item may be altered to change a duration, a date, or a time at which a meeting or event associated with the calendar item is to occur in order to resolve the conflict. A calendar item that is locked may only be altered by an owner of the calendar item to occur on a different day, at a different time, or for a different duration. The owner may specify that the calendar item is to be fixed when creating the calendar item. In the embodiments that provide for locked calendar items, the locked calendar items may be treated as if they are assigned a level of importance higher than all fluid calendar items. A trusted crowd may not be requested to vote regarding the level of importance for locked calendar items.

In some embodiments of the invention, a user may specify a calendar item as being private. The user may or may not be an owner of the calendar item in order to specify the calendar item as private. In such embodiments, a subject of the calendar item may be altered to hide specific details of the calendar item. For example, a user may receive a calendar item from human resources indicating a time and a location and having a subject of "your performance review." The user may not want others to know about the performance review. The user may alter the calendar item to be private in order to hide the details of the calendar item from others who may view the user's calendar.

Figure 4:
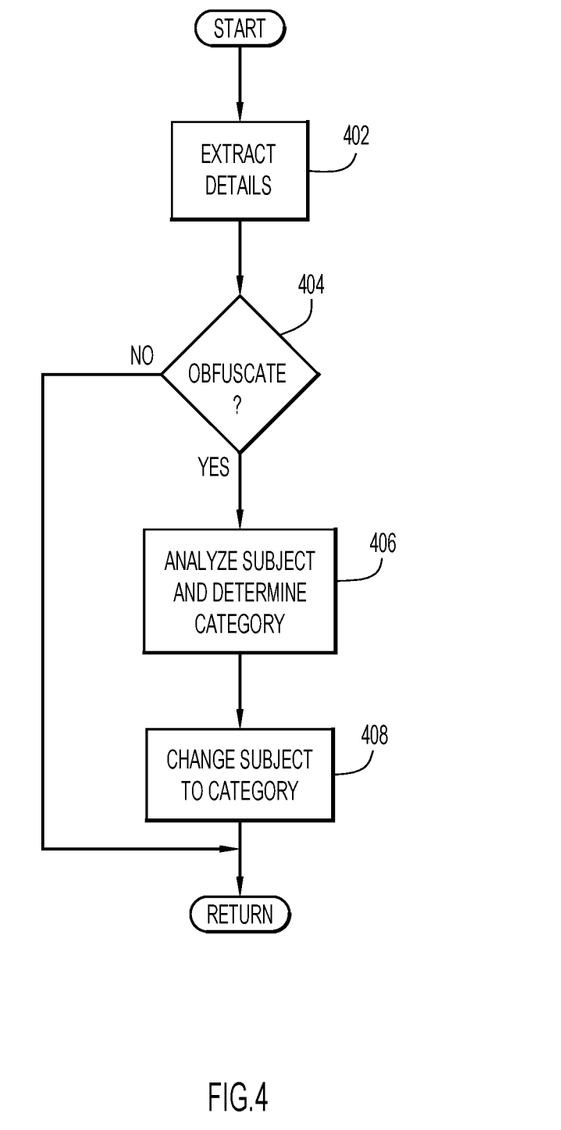
FIG. 4 is a flowchart of an example process for obfuscating a subject of a calendar item according to embodiments of the invention.

FIG. 4 is a flowchart of an example process that may be performed regarding a calendar item that is specified to be private in an embodiment that permits calendar items to be private. The process may begin by extracting details of the calendar item (act 402). In particular, the process may extract a subject of the calendar item. A determination may then be made regarding whether the calendar item is specified to be private (act 404). If the calendar item is not specified as being private, then the process is completed. Otherwise, the subject of the calendar item may be analyzed by natural language processing, which may check for a presence of certain keywords or phrases included in the subject. A category to which the calendar item belongs may then be determined based on the natural language processing (act 406). For example, if the subject is "your performance review", then the analysis may determine that a category to which the subject belongs is human resources.

Next, the subject of the calendar item may be obfuscated by changing the subject to be the determined category (act 408). Returning to the above example, the subject of the calendar item may be changed from "your performance review" to "human resources."

In some embodiments, calendar users may have user profiles in which respective users may indicate a number of preferences, which may include, but not be limited to, a desired amount of free time for each day, a minimum desired amount of time between meetings, a maximum number of parallel meetings. These preferences may be assigned a level of importance by respective users for conflict resolution purposes. The desired amount of free time for each day and the minimum desired amount of time between meetings may be included in respective user profiles. The desired amount of free time may be expressed as a percentage of a work day such as, for example, 50%, or may be expressed as an amount of time such as for example, 4 hours and 30 minutes.

Figure 5:
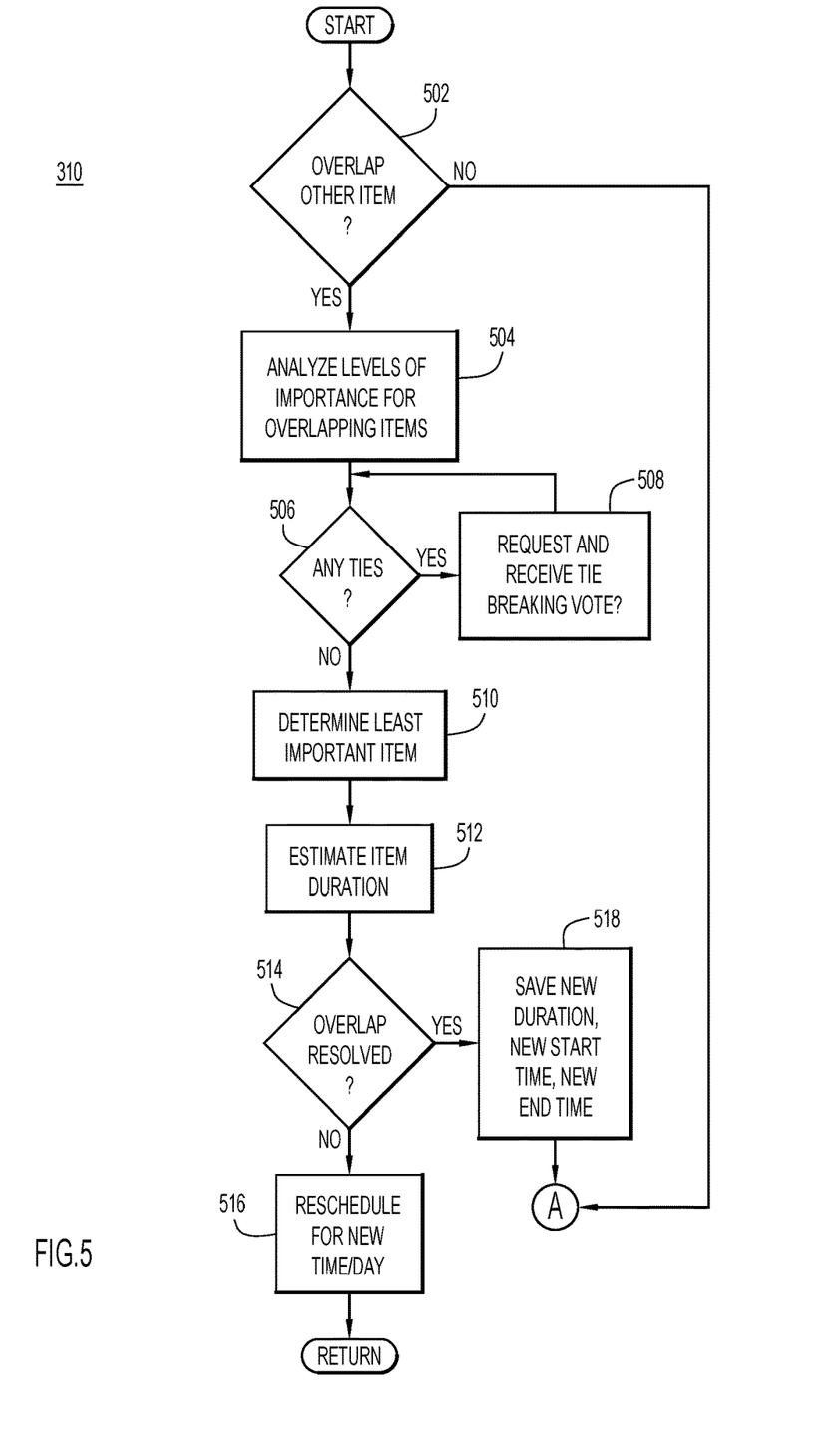
FIGS. 5 and 6 illustrate an example process for determining whether a calendar item is involved in a conflict and resolving the conflict according to embodiments of the invention.
Figure 6:
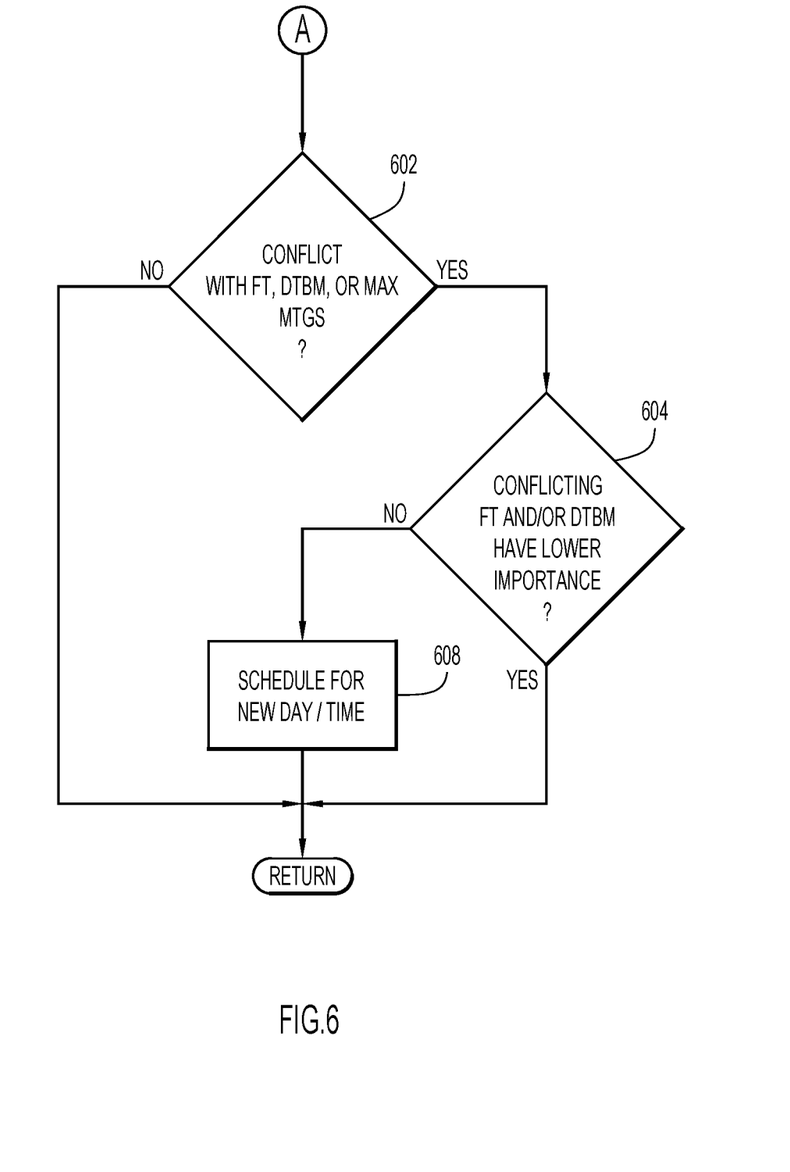

FIGS. 5 and 6 are flowcharts for an example process for performing act 310 (FIG. 3) to determine whether a conflict exists and, if so, resolving the conflict. The process may begin by determining whether a requested time and date for a calendar item overlaps with any other calendar items from calendars of users required to attend a meeting or event represented by the calendar item (act 502). If the calendar item does overlap with the any other calendar items, then the levels of importance assigned to the overlapping calendar items may be analyzed (act 504). A determination may be made regarding whether a tie exists for overlapping calendar items having a highest level of importance (act 506).

If, during act 506, the tie is determined to exist, then a tie-breaking vote may be requested, received, and tallied regarding a level of importance of each of the tied overlapping calendar items (act 508). Act 506 may then be performed again to make sure that the tie has been broken.

In some embodiments, when the tie-breaking vote is not received within a certain period of time, then an alternate tie-breaking voter may be assigned and the alternate tie-breaking voter may receive a request to vote.

In some embodiments, tie breaking voters may have been previously assigned by owners of calendar items. The owners of the calendar items may specify the tie-breaking voters based on a subject of the respective calendar items. Various embodiments may determine whether a tie-breaking voter had already voted as a member of a trusted crowd with respect to the tied calendar item. If so, the various embodiments may select a different tie-breaking voter. In other embodiments, a tie-breaking voter who had not voted with respect to a calendar item may be selected automatically based on the subject of the respective calendar item.

If, during act 506, no ties are found among the overlapping calendar items, then an overlapping calendar item having a lowest, or least, level of importance may be determined (act 510) and a duration with respect to the calendar item having the least level of importance may be estimated based on a maintained history of calendar items with a same or similar subject (act 512). A history of durations of calendar items and their respective subjects may be maintained by requesting users required for calendar items to provide actual durations of the calendar items after specified respective end times of the calendar item.

A determination may then be made regarding whether changing the duration of the calendar item having the least level of importance to the estimated duration resolves the overlap (act 514). If the changing the duration to the estimated duration would resolve the overlap, then the duration of this calendar item as well as a new start time or an new end time, or both the new start time and the new end time may be determined and saved for this calendar item (act 518).

If, during act 514, the overlap for this calendar item would not be resolved by using the estimated duration for this calendar item, then this calendar item may be rescheduled for an available time slot having the requested duration on a same or different day, with reference to the calendars of the users required for the calendar item (act 516). In some embodiments, when a calendar item is re-scheduled, a level of importance of the calendar item may be increased. In an embodiment in which users may configure a desired amount of free time and/or a desired time between meetings, an available time slot may not violate the desired amount of free time and/or the desired time between meetings for the required users with respect to the calendar item unless the calendar item has a higher level of importance than that of the desired amount of free time and/or the desired time between meetings.

In some embodiments, an attempt may be made to automatically schedule this calendar item within a specific time period of an originally requested time slot for this calendar item. The specific time period may be two days, four days, one week or another suitable time period. If an available time slot with the requested duration is not available within the specific time period, then one or more calendar items having a lower level of importance than this calendar item may be moved to a different time slot in order to schedule this calendar item within the specific time period. If the available time slot with the requested duration is still unavailable within the specific time period after considering moving the one or more calendar items having the lower level of importance, then users participating in meeting or event associated with the calendar item may be notified that the calendar item could not be scheduled within the specific time period of the originally requested time slot.

If, during act 502, a determination is made that a calendar item does not overlap another calendar item, or after performing act 518, a determination may be made regarding whether the calendar item conflicts with respective desired amounts of free time for respective users required to attend the meeting or the event associated with the calendar item, respective desired times between meetings for respective users required to attend the meeting or the event associated with the calendar item, and a maximum number of parallel meetings for users required to attend the meeting or the event associated with the calendar item (act 602; FIG. 6). If no conflict is detected, then the process is completed. Otherwise, a determination may be made regarding whether conflicting desired amounts of free time, conflicting desired times between meetings, and/or maximum number of parallel meetings have a lower level of importance than that of the calendar item (act 604). If so, the calendar item will remain in its time slot and the process may be completed. Otherwise, the calendar item may be rescheduled, as previously described with respect to act 518 and the process may be completed. In a variation of this embodiment, the desired amounts of free time for respective users, the desired times between meetings for respective users, and the maximum number of parallel meetings for respective users may be strict requirements for conflict purposes. In other words, these preferences would not be violated when meetings are scheduled in this variation.

Figure 7:
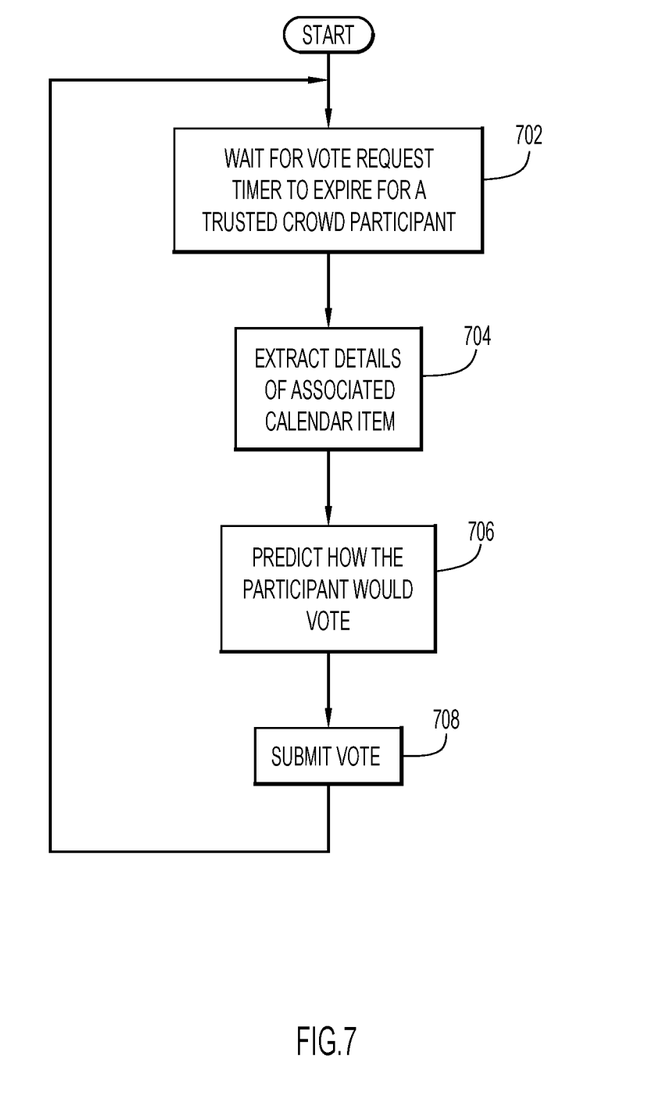
FIG. 7 is a flowchart of an example process for predicting and submitting a vote for a trusted crowd participant when the trusted crowd participant fails to vote within a certain period of time according to embodiments of the invention.

In some embodiments, when a user, who is a member of a trusted crowd for a calendar item, is requested to vote regarding a level of importance for the calendar item, a vote request timer may be started. The vote request timer may be started for a time period of one hour, four hours, one day, or another suitable time period. FIG. 7 is a flowchart illustrating an example process in such embodiments. The process may begin by waiting until a vote request timer expires due to a trusted crowd participant who has not responded to a request to vote (act 702). After the vote request timer expires, details of an associated calendar item such as, for example, a subject, may be extracted and an identity of the trusted crowd participant may be extracted from vote request timer information (act 704). Next, a prediction may be made regarding how the trusted crowd participant would have voted (act 706). The prediction may be based on using machine learning to analyze a voting history of the trusted crowd participant with respect to calendar items related to a subject of the calendar item. The trusted crowd participant's vote may then be submitted and tallied as if the trusted crowd participant had actually placed a vote in response to a voting request (act 708).

It will be appreciated that the embodiments described above and illustrated in the drawings represent only a few of the many ways of implementing various embodiments of the invention. Further other variations of the embodiments of the invention may be implemented. For example, in some embodiments, votes of some members of a trusted crowd may count more than votes of other members of the trusted crowd. In such embodiments, a weighting factor may be assigned to members of a trusted crowd. The weighting factor may be based on a member's relationships or a position within an organization. As an example, the votes may be tallied according to:

$$\frac{\sum_{i=1}^{n}(vote_i \times weight_i)}{\sum_{j=1}^{n}weight_j},$$

where n is a number of voters, $vote_i$ is user i's vote and i is in a range of 1 to n, $weight_i$ is user i's weighting factor, and $weight_j$ is user j's weighting factor and j is in a range of 1 to n.

In some variations of embodiments, a level of importance of a calendar item may be increased every time the calendar item is rescheduled. In variations of this embodiment, the level of importance for a calendar item may be increased after every x times the calendar item is rescheduled, where x may be 2, 3 or another value.

In some variations of embodiments, members of a trusted crowd may be asked to vote only when a conflict is detected.

In some other embodiments, durations of calendar items may always be estimated, if enough historical data is available, and the estimated duration may replace requested durations of the calendar items.

Some embodiments may use one or more machine learning techniques to find patterns regarding previous similar conflicts and their resolutions. In such embodiments, when a conflict is detected, the conflict may be resolved more quickly and efficiently based on the found patterns.

The computer or other processing systems employed by the present invention embodiments may be implemented by any number of any personal or other type of computer or processing system, such as a desktop, laptop, PDA, mobile devices, etc., and may include any commercially available operating system and any combination of commercially available and custom software. The software may include browser software, communications software, and server software). These systems may include any types of monitors and input devices, such as a keyboard, mouse, voice recognition, etc.), to enter and/or view information.

It is to be understood that the software of the present invention embodiments may be implemented in any desired computer language and could be developed by one of ordinary skill in the computer arts based on the functional descriptions contained in the specification and flowcharts illustrated in the drawings. Further, any references herein of software performing various functions generally refer to computer systems or processors performing those functions under software control. The computer systems of the present invention embodiments may alternatively be implemented by any type of hardware and/or other processing circuitry.

The various functions of the computer or other processing systems may be distributed in any manner among any number of software and/or hardware modules or units, processing or computer systems and/or circuitry, where the computer or processing systems may be disposed locally or remotely of each other and communicate via any suitable communications medium, such as a LAN, WAN, Intranet, Internet, hardwire, modem connection, wireless, etc. For example, the functions of the present invention embodiments may be distributed in any manner among the various computer systems, and/or any other intermediary processing devices. The software and/or algorithms described above and illustrated in the flowcharts may be modified in any manner that accomplishes the functions described herein. In addition, the functions in the flowcharts or description may be performed in any order that accomplishes a desired operation.

The software of the present invention embodiments may be available on a non-transitory computer useable medium, such as a magnetic or optical medium, magneto-optic mediums, floppy diskettes, CD-ROM, DVD, memory devices, etc., of a stationary or portable program product apparatus or device for use with stand-alone systems or systems connected by a network or other communications medium.

The communication network may be implemented by any number of any type of communications network, such as a LAN, WAN, Internet, Intranet, VPN, etc. The computer or other processing systems of the present invention embodiments may include any conventional or other communications devices to communicate over the network via any conventional or other protocols. The computer or other processing systems may utilize any type of connection (e.g., wired, wireless, etc.) for access to the network. Local communication media may be implemented by any suitable communication media, such as local area network (LAN), hardwire, wireless link, Intranet, etc.

The system may employ any number of any conventional or other databases, data stores or storage structures (e.g., files, databases, data structures, data or other repositories, etc.) to store information. The database system may be implemented by any number of any conventional or other databases, data stores or storage structures to store information. The database system may be included within or coupled to server and/or client systems. The database systems and/or storage structures may be remote from or local to a computer or other processing systems, and may store any desired data.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises", "comprising", "includes", "including", "has", "have", "having", "with" and the like, when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special-purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the FIGS. illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figs. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The invention claimed is:

1. A method for managing a computerized calendar comprising:
   receiving, by a computer system via a network, a calendar item for an event for the computerized calendar as an electronic message, wherein the calendar item includes a subject with information private to a user;
   determining, by the computer system, a category to which the calendar item belongs based on a presence of one of certain keywords and certain phrases included in the subject of the calendar item;
   obfuscating, by the computer system, the subject of the calendar item to hide the information private to the user from other users able to view the calendar item on the computerized calendar by replacing the subject of the calendar item including the information private to the user with the determined category;
   determining, by the computer system, a trusted crowd based on members being associated with a domain, wherein the trusted crowd includes users required to attend the event and a plurality of members not required to attend the event;
   determining, by the computer system, that at least one member of the trusted crowd delegated voting to at least one other user and replacing the at least one member in the trusted crowd with the at least one other user;
   requesting, by the computer system, the trusted crowd to vote on a level of importance of the calendar item on corresponding user processing devices to resolve a conflict with other calendar items on computerized calendars of the users required to attend the event;
   determining, by the computer system, that a vote from a member of the trusted crowd has not been received from a corresponding user processing device within a certain time period;
   predicting, by the computer system, the vote for the member of the trusted crowd by machine learning based on a voting history of the member of the trusted crowd with respect to calendar items related to the subject of the calendar item, wherein the predicted vote corresponds to a numeric value within a numeric range indicating the level of importance;

determining, by the computer system, the level of importance of the calendar item from the predicted vote and votes from the corresponding user processing devices of remaining members of the trusted crowd;

determining, by the computer system, that the level of importance of the calendar item is a same level as a greatest level of importance of the other calendar items;

conducting, by the computer system, a second vote by a second different trusted crowd on corresponding second user processing devices for the level of importance of the calendar item, wherein the second different trusted crowd excludes members from the trusted crowd;

determining, by the computer system, the level of importance of the calendar item from votes of the second different trusted crowd from the corresponding second user processing devices;

altering, by the computer system, the calendar item on the computerized calendars of the users required to attend the event based on the determined level of importance from the second different trusted crowd to change occurrence of the event in the computerized calendars to an altered time of the calendar item to resolve the conflict, wherein altering the calendar item includes:

identifying a locked calendar item from among the other calendar items on the computerized calendars such that a respective associated time of day and a respective associated date of the locked calendar item is changeable only by a calendar item owner; and altering the calendar item on the computerized calendars of the users required to attend the event without altering the locked calendar item; and sending, by the computer system, a notification indicating the altered time of the calendar item to user processing devices of the users required to attend the event.

2. The method of claim 1, wherein:
one or more calendar items are identified as fluid such that a respective associated time of day and a respective associated date of each of the one or more calendar items are changeable for conflict resolution.

3. The method of claim 1, further comprising:
configuring a user profile including preferences of a user of the computerized calendar according to received input, the preferences including at least one of a desired amount of free time, a desired amount of time between calendar items, and a maximum number of parallel calendar items.

4. The method of claim 3, wherein a conflict including the calendar item comprises one of the calendar item preventing a configured preference from being satisfied, and the calendar item having an overlap of time with another scheduled calendar item.

5. The method of claim 1, further comprising:
when a member of the trusted crowd fails to vote within a set period of time, automatically sending a reminder to vote on the level of importance of the calendar item to a user processing device of the member of the trusted crowd failing to vote.

6. The method of claim 1, wherein a weighting factor is assigned to each member of the trusted crowd such that votes of some members of the trusted crowd count more than votes of other members of the trusted crowd.

7. A computer system for managing a computerized calendar, the computer system comprising:
at least one processor; and
a memory connected to the at least one processor, wherein the at least one processor is configured to perform:

receiving, via a network, a calendar item for an event for the computerized calendar as an electronic message, wherein the calendar item includes a subject with information private to a user;

determining a category to which the calendar item belongs based on a presence of one of certain keywords and certain phrases included in the subject of the calendar item;

obfuscating the subject of the calendar item to hide the information private to the user from other users able to view the calendar item on the computerized calendar by replacing the subject of the calendar item including the information private to the user with the determined category;

determining a trusted crowd based on members being associated with a domain, wherein the trusted crowd includes users required to attend the event and a plurality of members not required to attend the event;

determining that at least one member of the trusted crowd delegated voting to at least one other user and replacing the at least one member in the trusted crowd with the at least one other user;

requesting the trusted crowd to vote on a level of importance of the calendar item on corresponding user processing devices to resolve a conflict with other calendar items on computerized calendars of the users required to attend the event;

determining that a vote from a member of the trusted crowd has not been received from a corresponding user processing device within a certain time period;

predicting the vote for the member of the trusted crowd by machine learning based on a voting history of the member of the trusted crowd with respect to calendar items related to the subject of the calendar item, wherein the predicted vote corresponds to a numeric value within a numeric range indicating the level of importance;

determining the level of importance of the calendar item from the predicted vote and votes from the corresponding user processing devices of remaining members of the trusted crowd;

determining that the level of importance of the calendar item is a same level as a greatest level of importance of the other calendar items;

conducting a second vote by a second different trusted crowd on corresponding second user processing devices for the level of importance of the calendar item, wherein the second different trusted crowd excludes members from the trusted crowd;

determining the level of importance of the calendar item from votes of the second different trusted crowd from the corresponding second user processing devices;

altering the calendar item on the computerized calendars of the users required to attend the event based on the determined level of importance from the second different trusted crowd to change occurrence of the event in the computerized calendars to an altered time of the calendar item to resolve the conflict, wherein altering the calendar item includes:

identifying a locked calendar item from among the other calendar items on the computerized calendars such that a respective associated time of day and a respective associated date of the locked calendar item is changeable only by a calendar item owner; and altering the calendar item on the computerized calendars of the users required to attend the event without altering the locked calendar item; and sending a notification indicating the altered time of the calendar item to user processing devices of the users required to attend the event.

8. The computer system of claim 7, wherein a conflict including the calendar item comprises at least one of:

the calendar item preventing a configured preference for a user required to attend the event of the calendar item from being satisfied, the calendar item having an overlap of time with another scheduled calendar item, and the calendar item causing a configured maximum number of parallel meetings for a user required to attend the event of the calendar item to be exceeded.

9. The computer system of claim 7, wherein the at least one processor is configured to perform:

automatically increasing a level of importance assigned to the calendar item when the calendar item is delayed a certain number of times due to altering the calendar item for conflict resolution.

10. The computer system of claim 7, wherein the at least one processor is configured to perform:

estimating a duration of the calendar item based on a history of calendar items related to a subject matter of the calendar item, and changing the duration of the calendar item based on the estimated duration to resolve the conflict.

11. The computer system of claim 7, wherein:

one or more calendar items are identified as fluid such that a respective associated time of day and a respective associated date of each of the one or more calendar items are changeable for conflict resolution.

12. A computer program product comprising at least one non-transitory computer readable storage medium having computer readable program code embodied therewith for execution on at least one processor of a processing device, the computer readable program code being configured to be executed by the at least one processor to perform:

receiving, via a network, a calendar item for an event for a computerized calendar as an electronic message, wherein the calendar item includes a subject with information private to a user;

determining a category to which the calendar item belongs based on a presence of one of certain keywords and certain phrases included in the subject of the calendar item;

obfuscating the subject of the calendar item to hide the information private to the user from other users able to view the calendar item on the computerized calendar by replacing the subject of the calendar item including the information private to the user with the determined category;

determining a trusted crowd based on members being associated with a domain, wherein the trusted crowd includes users required to attend the event and a plurality of members not required to attend the event;

determining that at least one member of the trusted crowd delegated voting to at least one other user and replacing the at least one member in the trusted crowd with the at least one other user;

requesting the trusted crowd to vote on a level of importance of the calendar item on corresponding user processing devices to resolve a conflict with other calendar items on computerized calendars of the users required to attend the event;

determining that a vote from a member of the trusted crowd has not been received from a corresponding user processing device within a certain time period;

predicting the vote for the member of the trusted crowd by machine learning based on a voting history of the member of the trusted crowd with respect to calendar items related to the subject of the calendar item, wherein the predicted vote corresponds to a numeric value within a numeric range indicating the level of importance;

determining the level of importance of the calendar item from the predicted vote and votes from the corresponding user processing devices of remaining members of the trusted crowd;

determining that the level of importance of the calendar item is a same level as a greatest level of importance of the other calendar items;

conducting a second vote by a second different trusted crowd on corresponding second user processing devices for the level of importance of the calendar item, wherein the second different trusted crowd excludes members from the trusted crowd;

determining the level of importance of the calendar item from votes of the second different trusted crowd from the corresponding second user processing devices;

altering the calendar item on the computerized calendars of the users required to attend the event based on the determined level of importance from the second different trusted crowd to change occurrence of the event in the computerized calendars to an altered time of the calendar item to resolve the conflict, wherein altering the calendar item includes:

identifying a locked calendar item from among the other calendar items on the computerized calendars such that a respective associated time of day and a respective associated date of the locked calendar item is changeable only by a calendar item owner; and altering the calendar item on the computerized calendars of the users required to attend the event without altering the locked calendar item; and sending a notification indicating the altered time of the calendar item to user processing devices of the users required to attend the event.

13. The computer program product of claim 12, wherein the computer readable program code is further configured to be executed by the at least one processor to perform:

sending a reminder to vote on the level of importance of the calendar item to one or more members of the trusted crowd after a specific period of time has passed after the one or more members was requested to vote and a vote from the one or more members was not received.

14. The computer program product of claim 12, wherein the computer readable program code is further configured to be executed by the at least one processor to perform:

extracting the subject from a Multi-Purpose Internet Mail Extension of the calendar item.

* * * * *